US008666576B2

(12) United States Patent
Kim

(10) Patent No.: US 8,666,576 B2
(45) Date of Patent: Mar. 4, 2014

(54) TECHNIQUE FOR CALCULATING DISTANCE TO EMPTY IN ELECTRIC VEHICLE

(75) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 9 days.

(21) Appl. No.: 13/443,197

(22) Filed: Apr. 10, 2012

(65) Prior Publication Data

US 2013/0158758 A1    Jun. 20, 2013

(30) Foreign Application Priority Data

Dec. 15, 2011   (KR) .................. 10-2011-0135206

(51) Int. Cl.
*B60W 20/00*       (2006.01)
(52) U.S. Cl.
USPC ........... 701/22; 701/123; 180/65.21; 903/903
(58) Field of Classification Search
USPC .................. 701/22, 123; 180/65.21; 903/903
See application file for complete search history.

(56) References Cited

U.S. PATENT DOCUMENTS

| 2007/0174004 | A1* | 7/2007 | Tenzer et al. | 701/123 |
| 2012/0022775 | A1* | 1/2012 | Yamada et al. | 701/123 |
| 2012/0143413 | A1* | 6/2012 | Cho et al. | 701/22 |
| 2013/0073113 | A1* | 3/2013 | Wang et al. | 701/1 |

FOREIGN PATENT DOCUMENTS

| JP | 2009056940 A |   | 3/2009 |
| JP | 2009171647 A |   | 7/2009 |
| JP | 2010226795 A | * | 10/2010 |
| KR | 10-2009-0038943 |   | 4/2009 |
| KR | 10-2011-0055293 |   | 5/2011 |

OTHER PUBLICATIONS

English translation of JP 2010226795 A.*

* cited by examiner

*Primary Examiner* — Fadey Jabr
*Assistant Examiner* — Yazan A Soofi
(74) *Attorney, Agent, or Firm* — Edwards Wildman Palmer LLP; Peter F. Corless

(57) ABSTRACT

Disclosed is a technique for calculating Distance to Empty (DTE) in an electric vehicle. In the disclosed technique, a past driving average fuel efficiency is calculated. An air conditioning average energy consumption rate during past driving is calculated. A past driving average fuel efficiency when assuming an air conditioning apparatus is not used from the past driving average fuel efficiency and the air conditioning average energy consumption rate is calculated. A current driving fuel efficiency is calculated. Then the past driving average fuel efficiency when assuming the air conditioning apparatus is not used and the current driving fuel efficiency are blended, and the DTE is calculated from the blended driving fuel efficiency.

9 Claims, 3 Drawing Sheets

TECHNIQUE FOR CALCULATING DISTANCE TO EMPTY IN ELECTRIC VEHICLE

CROSS-REFERENCE TO RELATED APPLICATION

This application claims under 35 U.S.C. §119(a) the benefit of Korean Patent Application No. 10-2011-0135206 filed Dec. 15, 2011, the entire contents of which are incorporated herein by reference.

BACKGROUND (a) Technical Field

The present invention relates to a system method for calculating Distance to Empty (DTE) in an electric vehicle. More particularly, it relates to a method for more accurately calculating DTE by excluding energy consumption used by an air conditioning apparatus from the total energy consumption of a battery (b) Background Art Generally, electric vehicles are powered by motors driven via electricity charged in a battery. In electric vehicles, it is very important to know and monitor instantaneous properties of the battery such as the temperature of the battery and the State of Charge (SOC) of the battery. By monitoring these properties, vehicle control systems are able to better maintain the state of the battery at a level that is provides the best efficiency and performance.

A Battery Management System (BMS) is an electronic system that takes into consideration these properties to assist a vehicle in efficient operation. The BMS operates by preventing the shortening of the battery lifespan due to the reduction of the durability of the battery and informing a vehicle controller performing overall control of the SOC information of the state of the battery.

It is particularly important to check the SOC of the battery in electric vehicles that use high voltage batteries, and monitor and report the remaining capacity of the battery to a driver during operation. For example, in internal combustion engine vehicles, a driver is informed of Distance to Empty (DTE) estimated based on the current fuel state. In electric vehicles, however, DTE is estimated from the current battery energy state, and then is shown on a cluster to the driver so that they may estimate how much further they can travel before they need to recharge the vehicle.

Typically, the DTE in an electric vehicle is calculated by estimating the DTE using a relationship between the SOC (%) (the amount of energy remaining in the high voltage battery) and the energy consumption rate per distance.

FIG. 1 is a flowchart illustrating a typical method of calculating DTE. Hereinafter, the typical method of calculating DTE will be described with reference to FIG. 1. More specifically, the DTE in an electric vehicle is calculated by first calculating a past average fuel efficiency (S1), then calculating a current fuel efficiency (S2) and a final fuel efficiency by blending the past average fuel efficiency and the current fuel efficiency (S3), and finally, calculating a DTE from the final fuel efficiency (S4).

Here, the past driving average fuel efficiency is calculated by averaging the fuel efficiency of past driving cycles (i.e., the interval from previous charging to next charging is defined as one driving cycle). The fuel efficiency (km/%) is calculated and stored at the end of every driving cycle (i.e., the previous driving cycle is finished when charging is initiated), and then the stored fuel efficiencies are averaged.

In this case, the fuel efficiency (km/%) of the driving cycle is expressed as accumulation driving distance during a driving cycle (km)/$\Delta$SOC(%), where $\Delta$SOC(%)=SOC(%) immediately after previous charging−SOC(%) just before current charging.

When the final fuel efficiency is calculated, DTE is calculated based on the fuel efficiency, and then displayed on the cluster, etc. In this case, DTE can be expressed as final fuel efficiency (km/%) X current SOC (%). Thus, in calculating DTE of an electric vehicle, the battery SOC is needed. More specifically, when the fuel efficiency of past driving cycles is calculated, the total battery consumption (corresponding to the above $\Delta$SOC) during cycles is reflected.

In electric vehicles, methods for calculating battery SOC are well known. For example, there is a method of calculating the battery SOC by measuring the amount of discharged current per unit hour. These calculated SOC values are being widely used for battery management, DTE calculation, and other purposes for vehicles.

However, often times, the resulting DTE provided to drivers using the above known methods are subject to and result in erroneous values caused from estimation difficulties and incorrect estimation values. Particularly, energy consumption of past driving cycles should be reflected in calculating the DTE, and in this case, the total battery consumption should be reflected. However, since the total battery consumption includes the energy consumed by an air conditioning apparatus during the past driving cycles as well, it is difficult to calculate an exact DTE which excludes this type of energy consumption.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system and method for more accurately calculating Distance to Empty (DTE) by excluding energy consumption used by an air conditioning apparatus from the total energy consumption of a battery.

In one aspect, the present invention provides a method for calculating Distance to Empty (DTE) in an electric vehicle, including: calculating a past driving average fuel efficiency; calculating an air conditioning average energy consumption rate during past driving cycles; calculating a past driving average fuel efficiency while assuming an air conditioning apparatus is not used from the past driving average fuel efficiency and the air conditioning average energy consumption rate; calculating a current driving fuel efficiency; blending the past driving average fuel efficiency while assuming the air conditioning apparatus is not used and the current driving fuel efficiency; and calculating the DTE from the blended driving fuel efficiency.

In an exemplary embodiment, the calculating of the DTE from the blended driving fuel efficiency may include: calculating a fuel efficiency corresponding to current power consumed by an air conditioning apparatus; calculating a final fuel efficiency by reflecting the fuel efficiency corresponding to the current power consumed in the air conditioning apparatus on the blended driving fuel efficiency; and calculating the DTE from the final fuel efficiency.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
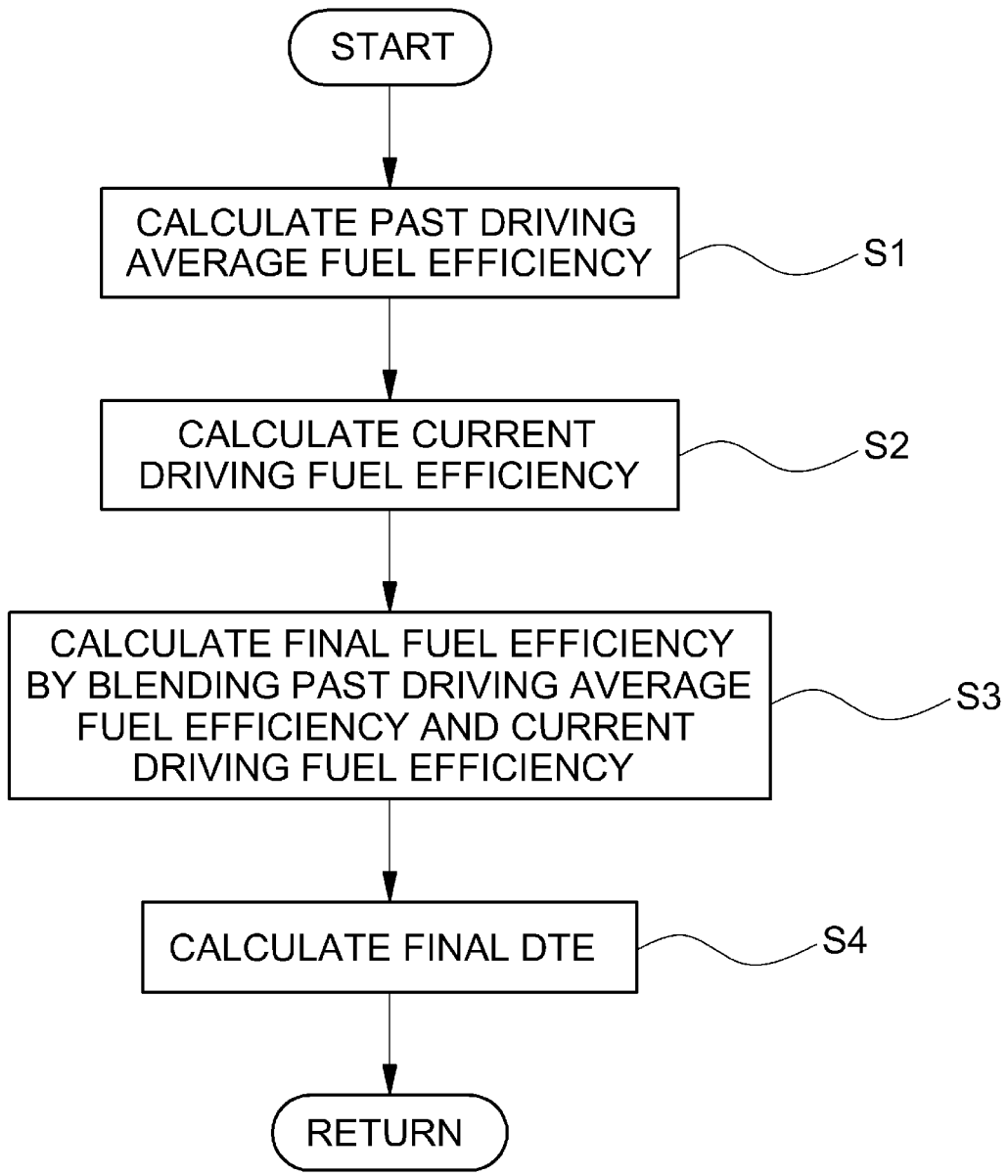
FIG. 1 is a flowchart illustrating a conventional method of calculating Distance to Empty (DTE)

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings.

The present invention relates to a method for calculating Distance to Empty (DTE) in an electric vehicle, which can more accurately calculate DTE by removing energy consumed by an air conditioning apparatus and correcting average fuel efficiency of past driving cycles. Also, since a final fuel efficiency is calculated by reflecting fuel efficiency corresponding to power currently consumed in an air conditioning apparatus on the driving fuel efficiency calculated by blending the past average fuel and the current fuel efficiency, DTE can be more accurately calculated.

These calculations may be performed by a processor or controller. However, the execution and operational features are not limited thereto. That is, the technique described below may be implemented on a single controller or on a plurality of controllers communicatively connected through a Controller Area Network (CAN).

Figure 2:
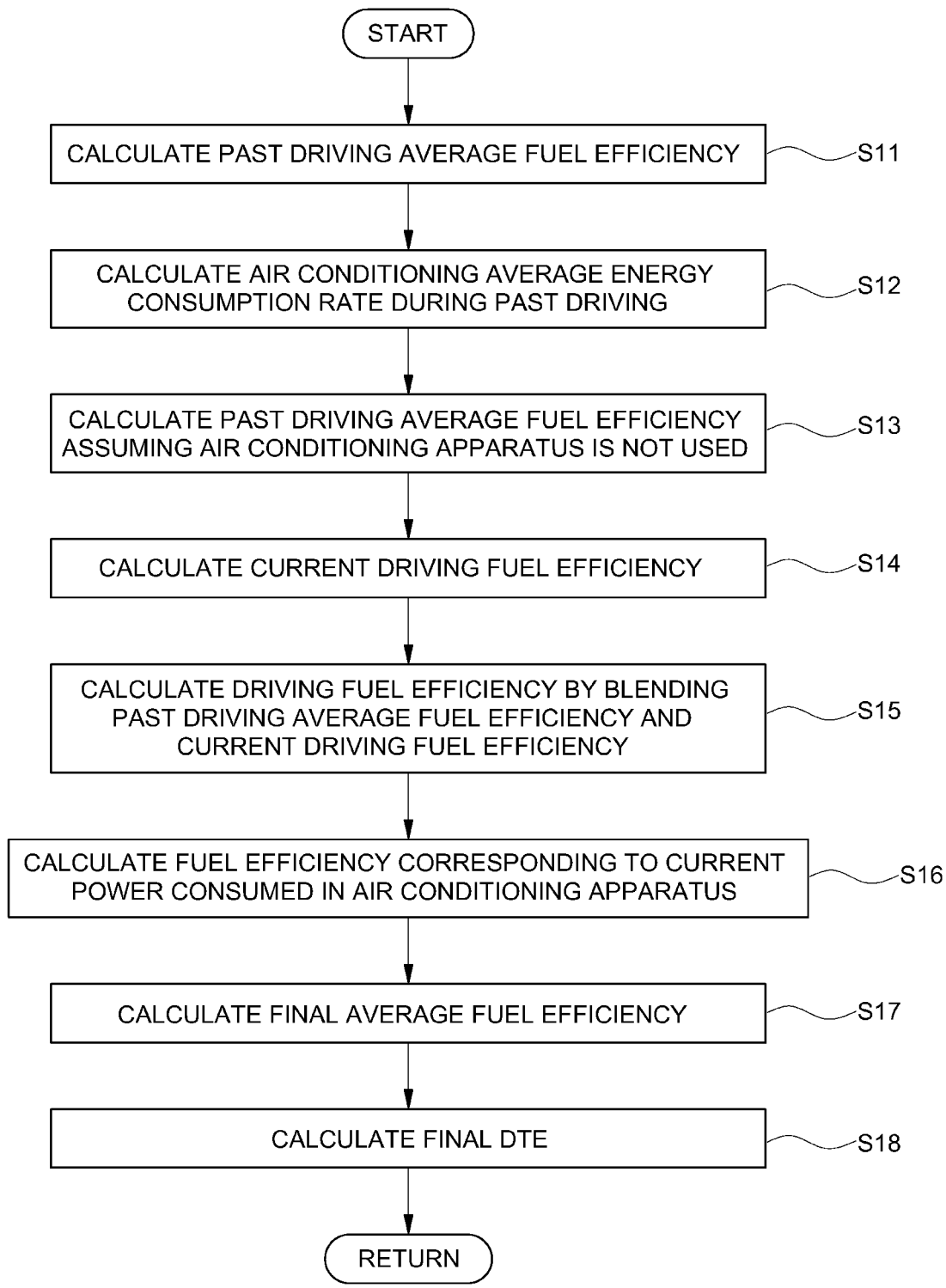
FIG. 2 is a flowchart illustrating a method of calculating DTE according to an embodiment of the present invention.
Figure 3:
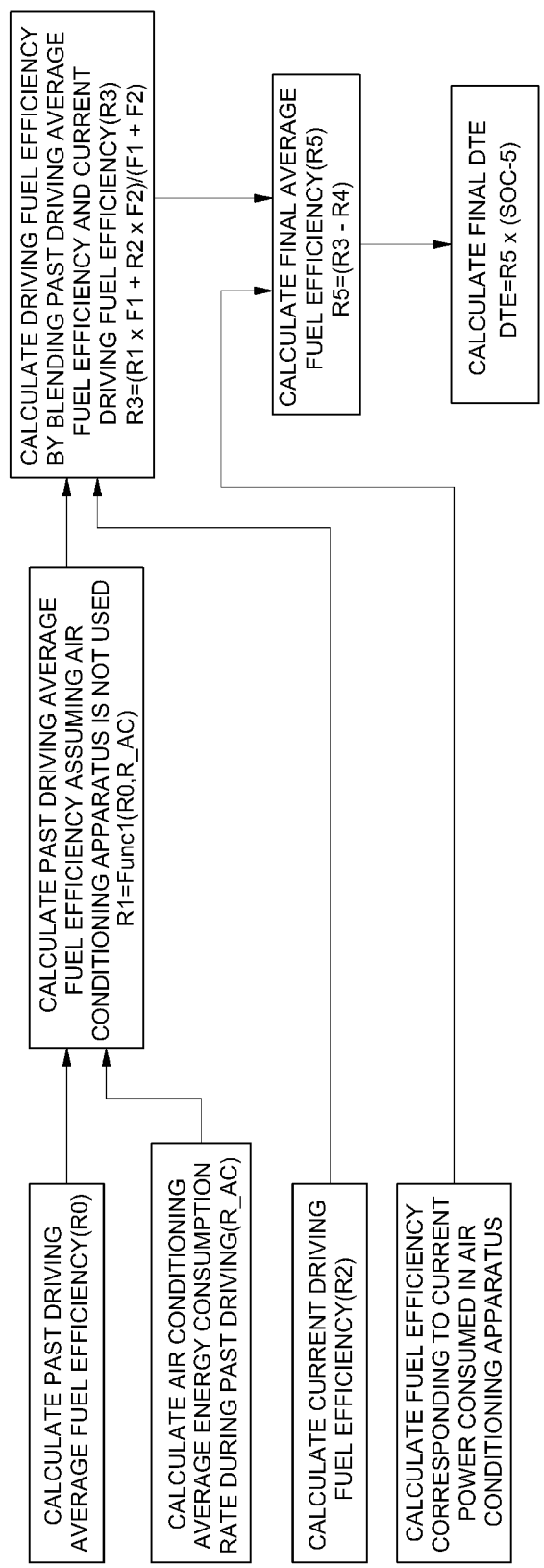
FIG. 3 is a flowchart illustrating calculation methods for each step of DTE calculation according to an embodiment of the present invention.

FIG. 2 is a flowchart illustrating a method of calculating DTE according to an embodiment of the present invention. FIG. 3 is a flowchart illustrating calculation methods for each step of DTE calculation according to an embodiment of the present invention.

As shown in FIG. 2, a method for calculating DTE may include calculating a past driving average fuel efficiency of at least on past driving cycle (S11 calculating an average energy consumption rate in an air conditioning apparatus during the past driving cycle (S12), correcting the past driving average fuel efficiency by assuming the air conditioning apparatus is not being used (S13), calculating a current driving fuel efficiency (S14), blending the corrected past driving average fuel efficiency and the current driving fuel efficiency (S15), and calculating DTE from the blended driving fuel efficiency (S16 to S18).

Here, calculation of the DTE from the blended driving fuel efficiency may include calculating a current fuel efficiency corresponding to an amount of power consumed in the air conditioning apparatus (S16), calculating a final fuel efficiency by reflecting the fuel efficiency corresponding to the amount of power consumed in the air conditioning apparatus on the driving fuel efficiency (S17), and calculating DTE from the final fuel efficiency.

As stated above, in order to perform the above calculation processes, a controller may be provided which executes a computer readable medium containing program instructions related to the above method. The controller may include a storage device and a calculation block for performing calculations of each process. In this case, since DTE finally calculated has to be displayed on a cluster, the controller may include a trip computer, or a separate controller for calculating DTE and transmitting DTE to the trip computer.

Also, since the controller uses battery SOC information, the controller may be configured to receive the battery SOC information from a battery management system and receive information on an operational state and on/off signals of the air conditioning apparatus from an air conditioning controller.

Hereinafter, the calculation processes of FIG. 2 will be described in detail with reference to FIG. 3.

Past Driving Average Fuel Efficiency Calculation (S11)

Initially, the past driving average fuel efficiency R0 (km/%) may be calculated by averaging fuel efficiencies over a plurality of past driving cycles (e.g., each individual interval from a previous charging to next charging is defined as one driving cycle). The fuel efficiency (km/%) may be calculated and stored at the end of every driving cycle (e.g., previous driving cycle is finished when charging), and then the stored fuel efficiencies may be averaged.

In this case, the fuel efficiency (km/%) of the driving cycle may be expressed as accumulation driving distance of a corresponding driving cycle (km)/$\Delta SOC(\%)$, where $\Delta SOC(\%) = SOC(\%)$ immediately after a previous charging − $SOC(\%)$ just before a current charging of the battery.

The fuel efficiency calculated above may be stored in n buffers of a storage device. Since the fuel efficiencies of all driving cycles may be stored n buffers, the oldest fuel efficiency data may be deleted when a new fuel efficiency data is stored.

A certified fuel efficiency (e.g., a value calculated and inputted through a fuel efficiency test on a corresponding vehicle model) may be stored in one buffer of the storage device, and the past driving average fuel efficiency R0 may be calculated from the fuel efficiency of the driving cycle and the certified fuel efficiency.

For calculation of average fuel efficiency, a weighted average method in which a weighed value is applied to each fuel efficiency may be used. For example, the average fuel efficiency may be expressed as Equation (1).

$$R0=\{A1 \times a[0]+A2 \times a[1]+A3 \times a[2]+\ldots+An \times a[n-1]+B \times b[0]\}/(A1+A2+A3+\ldots An+B) \quad (1)$$

where R0 is a past driving average fuel efficiency, A1, A2, A3, An and B denote weighted value, $a[0]$, $a[1]$, $a[2]$, and $a[n-1]$ denote fuel efficiencies of each driving cycle, and $b[0]$ denotes a certified fuel efficiency.

Calculation of Average Energy Consumption Rate in Air Conditioning Apparatus During Past Driving (S12)

A past driving air conditioning average energy consumption rate R_AC (%) may be calculated by averaging energy consumption rate in the air conditioning apparatus during at least one past driving cycle. For example, whenever each driving cycle is finished, the energy consumption rate (%) in the air conditioning apparatus may be calculated and stored, and then the stored energy consumption rates may be averaged to obtain the past driving air conditioning average energy consumption rate R_AC.

Here, the air conditioning energy consumption rate of each driving cycle may be defined as energy consumption rate of the air conditioning apparatus with respect to the total battery energy consumption of a corresponding driving cycle. The rates calculated as above may be stored in n buffers of the storage device. The fuel efficiencies of all driving cycles may be stored in n buffers, and the oldest rate data may be deleted when a new rate data is stored to maintain storage efficiency.

A predetermined value (e.g., 0%) when assuming the air conditioning apparatus is not used may be stored in one buffer of the storage device, and the past driving air conditioning average energy consumption rate R_AC may be calculated using the rate of the driving cycle and the predetermined value.

For calculation of average energy consumption rate, a weighted average method in which a weighed value is applied to each energy consumption rate and the predetermined value may be used. For example, the past driving air conditioning average energy consumption rate R_AC may be expressed as Equation (2).

$$R\_AC=\{C1 \times c[0]+C2 \times c[1]+C3 \times c[2]+\ldots+Cn \times c[n-1]+D \times d[0]\}/(C1+C2+C3+\ldots Cn+D) \quad (2)$$

where R_AC denotes a past driving air conditioning average energy consumption rate, C1, C2, C3, Cn, and D denote weighted values, $c[0]$, $c[1]$, $c[2]$, and $c[n-1]$ denote the rates of each driving cycle, and $d[0]$ denotes an assumed value when an air conditioning apparatus is not used.

Current Driving Fuel Efficiency Calculation (S14)

The current driving fuel efficiency R2 (km/%) may be calculated from an accumulated driving distance (km) after charging, the SOC (%) immediately after charging, and the current SOC (%). The current driving fuel efficiency R2 may be expressed as Equation (3).

$$R2=\text{Accumulated driving distance after charging}/(\text{SOC immediately after charging}-\text{current SOC}) \quad (3)$$

Calculation of Current Fuel Efficiency Corresponding to Power Consumption in Air Conditioning Apparatus (S16)

The current fuel efficiency R4 (km/%) corresponding to power consumed in the air conditioning apparatus may include calculating a fuel efficiency that can drive a vehicle using power consumed by the air conditioning apparatus when a driver operates the air conditioning apparatus (e.g., the process of converting power consumption into fuel efficiency corresponding to vehicle driving). The power consumption of the air conditioning apparatus may become power consumed in an air cooling apparatus such as air conditioner compressor and an air heating apparatus such as electric heater (e.g., PTC heater). The fuel efficiency corresponding to the power consumption of the air conditioning apparatus may be expressed as Equation (4), which is calculated as table values obtained by inputting the current power consumed in the air conditioning apparatus.

$$R4=\text{Func2}(\text{Power Consumption of Cooler}+\text{Power Consumption of Heater}) \quad (4)$$

where Func2 may be implemented as a table, and may be obtained a table in which fuel efficiency values are predefined according to power consumption.

In the illustrative embodiment of the present invention, the past driving average fuel efficiency may be corrected using the values calculated in the above processes (S13), and the past driving average fuel efficiency and the current driving fuel efficiency may be blended (S15). Thereafter, the final fuel efficiency may be calculated (S17), and then a more accurate final DTE may be calculated therefrom (S18).

Correction of Past Driving Average Fuel Efficiency (S13)

The correcting of the past driving average fuel efficiency may be performed to remove energy consumed in the air conditioning apparatus from the past driving average fuel efficiency R0 calculated in the previous process, and may include obtaining a past driving average fuel efficiency R1 (km/%) by assuming that the air conditioning apparatus is not used.

The past driving average fuel efficiency R1 may be expressed as Equation (5), in which the past driving average fuel efficiency R0 and the air conditioning average energy consumption rate R_AC obtained in the above processes are used as input map values.

$$R1=\text{Func1}(R0,R\_AC) \quad (5)$$

where Func1 may be implemented as a map, and the correction of R0 may be performed according to R_AC (0 to 100%).

Blending of Past Driving Average Fuel Efficiency and Current Driving Fuel Efficiency (S15)

In the blending of the past driving average fuel efficiency and the current driving fuel efficiency, the fuel efficiencies obtained in the above processes, particularly, the past driving average fuel efficiency R1 (km/%) obtained by assuming the air conditioning apparatus is not used, and the current driving fuel efficiency R2 (km/%) may be blended to obtain a fuel efficiency R3 (km/%). The fuel efficiency R3 (km/%) may be used to calculate a final fuel efficiency R5 that reflects current power consumption in the air conditioning apparatus.

Here, the fuel efficiency R3 obtained by the above blending process may be an average value of the past driving fuel efficiency R1 obtained by assuming the air conditioning apparatus is not used and the current driving fuel efficiency R2. In order to calculate the average value, a weighted average technique of applying a weighted value to each fuel efficiency may be used. The fuel efficiency R3 may be expressed as Equation (6).

$$R3=(R1\times F1+R2\times F2)/(F1+F2) \quad (6)$$

Final Fuel Efficiency Calculation (S17) and DTE Calculation (S18)

The final fuel efficiency R5 (km/%) may be obtained by subtracting the fuel efficiency R4 corresponding to the current power consumed in the air conditioning apparatus from the blended fuel efficiency R3. Thereafter, DTE (km) may be finally obtained from the final fuel efficiency R5 and the current battery SOC (%).

The final fuel efficiency R5 and DTE may be expressed as Equations (7) and (8).

$$R5=R3-R4 \quad (7)$$

$$DTE=R5\times(SOC-5) \quad (8)$$

where '5' is a set value, and is changeable.

Furthermore, the control logic of the above illustrative embodiment of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Thus, since the past driving average fuel efficiency is corrected by removing energy consumed in the air conditioning apparatus and the final fuel efficiency is calculated by reflecting the fuel efficiency, corresponding to current power consumed by the air conditioning apparatus, on the driving fuel efficiency calculated by blending the past driving average fuel efficiency and the current driving fuel efficiency, DTE can be more accurately calculated compared to conventional techniques.

Thus, according to the illustrative exemplary embodiment of the present invention, DTE can be more accurately calculated by removing energy consumed in an air conditioning apparatus and correcting average fuel efficiency of past driving. Also, since a final fuel efficiency is calculated by reflecting fuel efficiency, corresponding to power currently consumed in an air conditioning apparatus, on the driving fuel efficiency calculated by blending the past average fuel and the current fuel efficiency, DTE can be more accurately calculated.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for calculating a Distance to Empty (DTE) in an electric vehicle, comprising:
   calculating, by at least one controller, a past driving average fuel efficiency;
   calculating, by at least one controller, an air conditioning average energy consumption rate during at least one past driving cycle;
   calculating, by at least one controller, a past driving average fuel efficiency which assumes an air conditioning apparatus is not used from the past driving average fuel efficiency and the air conditioning average energy consumption rate;
   calculating, by at least one controller, a current driving fuel efficiency;
   blending, by at least one controller, the past driving average fuel efficiency assumes the air conditioning apparatus is not used and the current driving fuel efficiency; and
   calculating the DTE from the blended driving fuel efficiency,
   wherein the blending of the past driving average fuel efficiency and the current driving fuel efficiency is calculated by applying a weighted average method, wherein the weighted average method applies a weighted value to the past driving average fuel efficiency which assumes the air conditioning apparatus is not used and the current driving fuel efficiency,
   the average fuel efficiency is expressed as:

$$R0=\{A1\times a[0]+A2\times a[1]+A3\times a[2]\ldots+An\times a[n-1]+B\times b[0]\}/(A1+A2+A3+\ldots An+B)$$

where R0 is the past driving average fuel efficiency, A1, A2, A3, An and B denote weighted value, a[0], a[1], a[2], and a[n-1] denote fuel efficiencies of each driving cycle, and b[0] denotes a certified fuel efficiency.

2. The method of claim 1, wherein the air conditioning average energy consumption rate during past driving is calculated by averaging air conditioning energy consumption rate of past driving cycles that are defined as intervals from previous charging to next charging, and an air conditioning energy consumption rate of each driving cycle is a rate of energy consumed in the air conditioning apparatus with respect to a total battery energy consumption of the corresponding driving cycle.

3. The method of claim 2, wherein the air conditioning average energy consumption rate is calculated by a weighted average wherein the weighted average method applies a weighted value a predetermined assumed value when the air conditioning apparatus is not used and the air conditioning energy consumption rate of each driving cycle.

4. The method of claim 1, wherein the past driving average fuel efficiency when assuming the air conditioning apparatus is not used is calculated into map values using the past driving average fuel efficiency and the air conditioning average energy consumption rate as input values.

5. The method of claim 1, wherein the calculating of the DTE from the blended driving fuel efficiency comprises:
   calculating a fuel efficiency corresponding to current power consumed in the air conditioning apparatus;
   calculating a final fuel efficiency by reflecting the fuel efficiency corresponding to the current power consumed by the air conditioning apparatus on the blended driving fuel efficiency; and
   calculating the DTE from the final fuel efficiency.

6. The method of claim 5, wherein the fuel efficiency corresponding to the current power consumed in the air conditioning apparatus is calculated from a table in which fuel efficiency values are defined according to power consumption.

7. The method of claim 5, wherein the final fuel efficiency is obtained by subtracting the fuel efficiency corresponding to the power consumed in the air conditioning apparatus from the driving fuel efficiency obtained by the blending.

8. A non-transitory computer readable medium containing program instructions executed by a controller, the computer readable medium comprising:

program instructions that calculate a past driving average fuel efficiency;

program instructions that calculate an air conditioning average energy consumption rate during at least one past driving cycle;

program instructions that calculate a past driving average fuel efficiency which assumes an air conditioning apparatus is not used from the past driving average fuel efficiency and the air conditioning average energy consumption rate;

program instructions that calculate, a current driving fuel efficiency;

program instructions that blend the past driving average fuel efficiency assumes the air conditioning apparatus is not used and the current driving fuel efficiency; and program instructions that calculate the DTE from the blended driving fuel efficiency, wherein the blending of the past driving average fuel efficiency and the current driving fuel efficiency is calculated by applying a weighted average method, wherein the weighted average method applies a weighted value to the past driving average fuel efficiency which assumes the air conditioning apparatus is not used and the current driving fuel efficiency, the average fuel efficiency is expressed as:

$$R0=\{A1 \times a[0]+A2 \times a[1]+A3 \times a[2]+ \ldots +An \times a[n-1]+B \times b[0]\}/(A1+A2+A3+ \ldots An+B)$$

where R0 is the past driving average fuel efficiency, A1, A2, A3, An and B denote weighted value, a[0], a[1], a[2], and a[n−1] denote fuel efficiencies of each driving cycle, and b[0] denotes a certified fuel efficiency.

9. The non-transitory computer readable medium of claim 8, wherein the program instructions that calculate of the DTE from the blended driving fuel efficiency further r include:

program instructions that calculate a fuel efficiency corresponding to current power consumed in the air conditioning apparatus;

program instructions that calculate a final fuel efficiency by reflecting the fuel efficiency corresponding to the current power consumed by the air conditioning apparatus on the blended driving fuel efficiency; and program instructions that calculate the DTE from the final fuel efficiency.

* * * * *